Patented Oct. 26, 1954

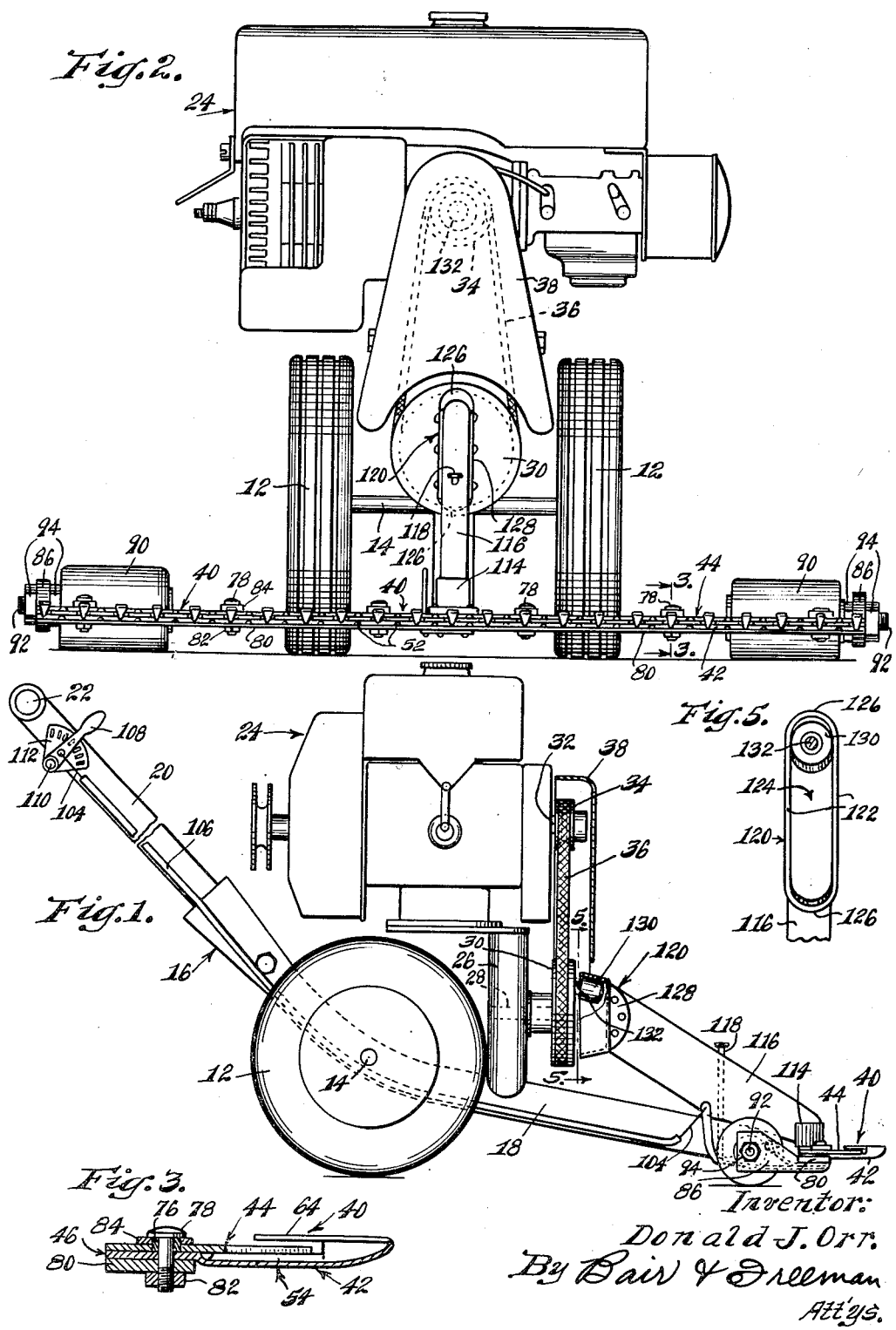

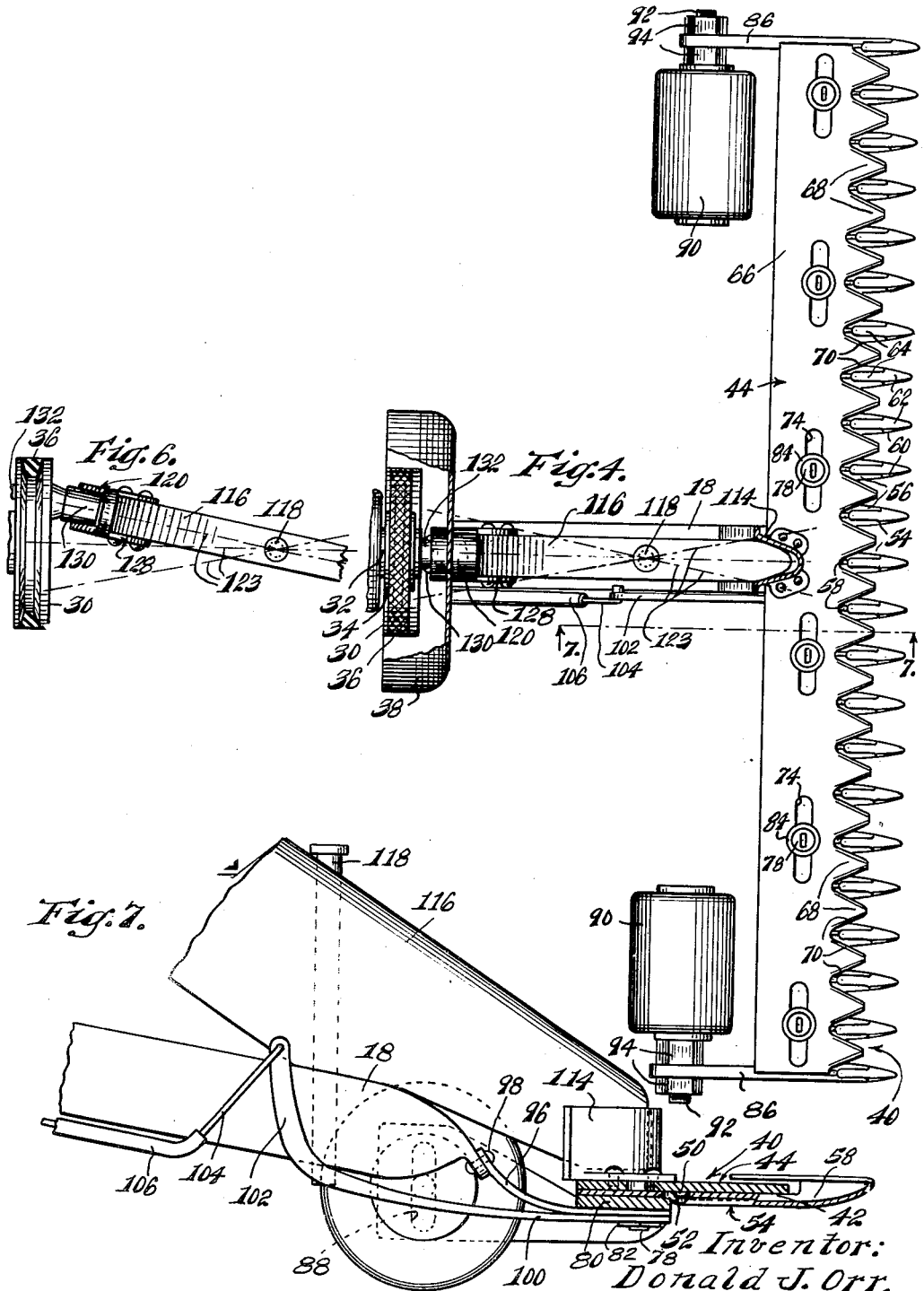

2,692,508

UNITED STATES PATENT OFFICE 2,692,508

DEVICE FOR CONVERTING ROTARY MOTION TO RECIPROCATING MOTION

Donald J. Orr, Arnolds Park, Iowa, assignor, by mesne assignments, of one-half to Karl W. George Application December 4, 1948, Serial No. 63,599

1 Claim. (Cl. 74—45)

This invention relates to power mowers of the type manipulable by manpower, and especially adapted for mowing lawns.

The mower is of that general type having a cutter bar and sickle assembly, in which the sickle bar reciprocates in the cutter bar, and having an engine for operating the sickle bar.

An object of the invention is the provision of a novel operating means for interconnecting the engine and sickle for operating or reciprocating the sickle bar.

Another object is the provision of a mower of the character referred to, in which the engine has a rotating cam, and the operating means engages the cam, and the operating means has an axial component forming its main dimension, in which is provided a novel means for accommodating the constantly changing angular relationship between the operating means and the cam.

With these and other objects in view, my invention consists in the arrangement and combination of the various parts of my device whereby the objects contemplated are attained, as hereinafter more fully set forth, pointed out in my claims and illustrated in the accompanying drawings, wherein:

Figure 1 is a side elevational view of the mower of the present invention.

Figure 2 is an enlarged front elevational view.

Figure 3 is a sectional view taken on line 3—3 of Figure 2.

Figure 4 is a top view of the mower proper and the arm for actuating the sickle.

Figure 5 is a view taken on line 5—5 of Figure 1.

Figure 6 is a view of the left portion of Figure 4 in an alternate position.

Figure 7 is an enlarged view taken on line 5—5 of Figure 4.

Referring in detail to the drawings, the power operated mower of the present invention is shown in its entirety in Figures 1 and 2. The mower includes a pair of spaced wheels 12 supported by an axle 14. A frame is indicated at 16 and includes a lower curved portion pivoted intermediate its ends on the axle 14. In the operating position of the mower the lower portion of the frame element 18 extends forwardly and slightly downwardly, and the upward portion bends upwardly where a shank 20 extends upwardly. At the upper end of the shank 20 is a handle 22 by which the operator manipulates the machine.

Supported on the axle is a power unit 24 which may be any preferred type, such as a gasoline engine. The power unit 24 is supported on the axle 14 by any convenient structural frame member which includes a depending element 26 having a shaft 28 mounted therein. On the outer end of the shaft 28 is a pulley 30 which may be a V pulley if desired. The power unit 24 is provided with a driving shaft 32 having a V pulley 34. A belt 36 is trained over the pulleys 34 and 30 for driving the latter. A shield 38 is secured over the pulley 34 and extends down into proximity to the lower pulley 30 but does not cover the latter. The power unit may be employed for driving the wheels 12, within the concept of the present invention, so that the mower is fully powered.

Mounted on the lower end of the frame 16 is a cutter bar and sickle assembly indicated in its entirety at 40, the cutter bar being designated at 42 and the sickle at 44. A brief general description of the cutter bar 42 and sickle 44 is given hereinafter for fully describing the machine which includes the present invention.

The cutter bar 42 is preferably formed as a stamping, and includes an elongated plate-like flat member 46 having a plurality of teeth 54 extending outwardly from one side edge of the plate. The teeth 54 are all identical, being spaced longitudinally along the plate 46. An extension 64 extends from the outer point of each tooth back toward the plate 46, being spaced upwardly from the surface of the tooth proper.

The sickle 44 is shown in plan in Figure 4. The sickle includes an elongated plate-like member 66 slightly shorter than the plate 46 of the cutter bar. The plate 66 has a plurality of extensions 68 which form cutting teeth on the sickle. For convenience in terminology the extension 68 will be referred to as sections, to indicate the correlation with previously known types of sickles. The whole sickle 44 is formed as a stamping as mentioned above and therefore the sections 68 are formed integral with plate 66. Each section 68 includes lateral edges 70 which serve as cutting edges. In the upper surface shown in Figure 4 each cutting edge 70 is tapered or beveled downwardly to form a cutting edge which approximates a knife edge.

The plate portion 66 of the sickle is provided with a plurality of elongated slots 74 spaced at intervals longitudinally in the sickle. The sickle is mounted on the cutter bar in the usual manner, that is, the plate portions are disposed one over the other and the sections 70 extend out in the same direction as the teeth 54 with the sections slidable between the teeth proper and the extensions 64.

The means for mounting the sickle in the cutter bar is shown best in Figure 3. A roller or sleeve 76 surrounds a bolt 78, which is inserted into the slot 74 and through a hole in the cutter bar; the bolt is threaded in a hole in a mounting plate 80 positioned on the under surface of the cutter bar. A lock nut 82 is threaded on the lower end of the bolt. A washer 84 surrounds the upper end of the sleeve 76 substantially filling the space between the sickle and the head of the bolt as defined by the height of the sleeve. The binding force of the nut 82 is exerted through the sleeve 76, and the sickle is permitted to slide freely between the cutter bar and the head of the bolt.

On each end of the cutter bar is a rearwardly extending bracket 86, the rear ends of the bracket being provided with vertical slots 88 (Figure 7). Rollers 90 are secured to the brackets 86, the rollers having pins or shafts 92 inserted into slots 88 and mounted therein by lock nuts 94.

The cutter bar and sickle assembly 40 is mounted directly on the frame of the machine by means of a spring steel element 96. The element 96 is a flexible steel element which is secured to the under surface of the frame by means of directly connecting it to the mounting bar 80, and curves rearwardly and upwardly therefrom. The rear end of the spring element 96 is secured by means of a rivet 98 to the forward and lower end of the frame element 18.

Rigidly secured to the cutter bar is a lever arm 100. The lever 100 extends rearwardly from the cutter bar and sickle and for the purposes of convenience its rear end is provided with an up-standing portion 102. Secured in the upper end of the portion 102 is a wire 104 which is slidable in a small diameter tube 106, which is mounted on the frame and extends up to a position adjacent the handle 20. The upper end of the wire 104 is secured to a lever 108 pivoted at 110 on the frame. Cooperating with the lever 100 is a quadrant 112 having latch means by which the lever 108 can be secured in angularly adjusted position. On swinging the lever 108 the wire 104 is drawn or forced through the tube 106 and thereby actuates the lever 100 which in turn swings the cutter bar and sickle assembly which is accommodated by the fact that the spring steel member 96 is flexible.

The original height of the cutter bar and sickle is adjusted by the bolts 92 in the slots 88. For each position of the rollers 90, the cutter bar and sickle can be angularly adjusted up and down about the axis of the rollers 90.

Mounted on the upper surface of the sickle 44 is a socket or shoe 114 having an open face extending rearwardly from the sickle. An actuating arm 116 is mounted on the frame by means of a pin 118 supported in the portion 18 of the frame and defining a vertical axis for swinging of the arm 116. The axis 118 is disposed intermediate the ends of the arm. The arm 116 extends rearwardly and upwardly from the sickle and at the upper end of the arm is a socket element 120. The socket element 120 includes a pair of spaced side walls 122 which are parallel and lie in planes parallel with the longitudinal axis of the arm indicated by the dot-dash line 123. The side walls 122 define a socket 124 which is elongated in a vertical direction parallel with the pivotal axis 118 of the arm. The upper and lower walls 126 of the socket 124 diverge rearwardly slightly. The socket 120 is provided with ears 128 by which it is secured to the arm 116.

A roller 130 is mounted on a pin 132 which in turn is mounted on the pulley 30. The roller 130 is cylindrical, that is, its side walls are parallel with its own axis and the roller is received in the socket 124. The roller 130 is freely rotatable on the pin 132 and the axis of the roller is disposed at an angle with respect to the axis of the pulley 30, in such a manner that in all positions of rotation of the pulley, the axis of the roller intersects the axis of the pulley in the axis of the pin 118. The taper of the walls 126 accommodates the angularity of the roller 130. The side walls 122 of the socket accommodate the roller in all positions of the latter to the end that whatever position of rotation the pulley 30 is in, the arm 116 is in alignment with the axis of the roller 130. The side walls 122 are aligned with surfaces of the roller also. Figure 6 illustrates the roller 130 at one side, and in this position it will be noted that the axis of the roller coincides with the longitudinal axis 123 of the arm 116.

I have thus provided an entirely new and distinctive type of connection between the power unit and the sickle, whereby constantly changing angular positions of the interconnected parts are accommodated. The socket or shoe 114 and the lower end of the arm 116 are such that they remain in engagement with one another in any angular position of adjustment of the cutter bar caused by the lever 100.

While I have shown a particular embodiment of my invention, it will be understood of course that I do not wish to be limited thereto since many modifications may be made, and I therefore contemplate by the claims appended hereto to cover any such modifications or substitutions of equivalents as fall within the true spirit and scope of my invention.

I claim:

A drive device including a motor having a rotating drive shaft, a member spaced from said drive shaft and arranged for movement along a fixed straight path, and means for translating the rotary movement of said drive shaft into reciprocation of said member along said fixed path, said means comprising a rotatable disc spaced from said member, means connecting said disc with said drive shaft for effecting rotation of said disc, an elongated eccentric having a portion thereof rigidly connected to said disc, said eccentric extending transversely from said disc in the general direction towards said member, a single rigid arm extending between said disc and said member, said arm being pivoted at a point intermediate its ends about an axis parallel with said disc, said eccentric being inclined with respect to said disc so that extensions of the longitudinal axis of said eccentric and of the axis of said disc intersect at said pivot axis of the arm, an elongated cylindrical roller rotatably and concentrically mounted on said eccentric and mounted to have its longitudinal axis at all times coincident with the longitudinal axis of said eccentric, an elongated socket on one end of said arm receiving said roller therein and having its longitudinal axis parallel with the pivotal axis of the arm, said cylindrical roller engaging the walls of the socket to provide a line contact therebetween, said line contact between the roller and the walls of said socket being at all times parallel with the longitudinal axis of said eccentric, means connecting the other end of said arm with said member operative to reciprocate said member as said arm is caused to swing when the disc is rotated and said arm is caused to oscillate under the influence of said eccentric received in said socket, said means for connecting said other end of the arm with said reciprocable member including an open ended socket carried by said member and elongated in a direction parallel with the pivot axis of said arm and receiving said end of the arm, said elongated socket affording relative displacement therein of said end of the arm in a direction parallel with the pivot axis of the arm, and means for adjusting the relative position of engagement of the last said end of the arm along the length of said elongated socket.

References Cited in the file of this patent

UNITED STATES PATENTS

| Number | Name | Date |
|---|---|---|
| 491,910 | Virtue | Feb. 14, 1893 |
| 548,189 | Gillette | Oct. 22, 1895 |
| 604,353 | Kneisly | May 17, 1898 |
| 832,169 | Seip | Oct. 2, 1906 |
| 879,973 | Martin | Feb. 25, 1908 |
| 922,058 | Squair | May 18, 1909 |
| 1,302,836 | Noonan | May 6, 1919 |
| 1,610,498 | Ducket | Dec. 14, 1926 |
| 1,614,386 | Peebles | Jan. 11, 1927 |
| 1,692,494 | Eisele | Nov. 20, 1928 |
| 1,726,378 | Barber | Aug. 27, 1929 |
| 1,829,690 | Turner | Oct. 27, 1931 |
| 1,876,220 | Gravely | Sept. 6, 1932 |
| 2,219,494 | Rieger | Oct. 29, 1940 |
| 2,288,498 | Underwood | June 30, 1942 |
| 2,359,642 | Hayes | Oct. 2, 1944 |
| 2,466,594 | Kelsey | Apr. 5, 1949 |
| 2,475,195 | Oetken | July 5, 1949 |

FOREIGN PATENTS

| Number | Country | Date |
|---|---|---|
| 47,428 | France | Jan. 28, 1937 |
| | (2nd Addition to No. 754,490) | |
| 815,806 | France | Apr. 19, 1937 |